(12) United States Patent
Silver

(10) Patent No.: US 7,186,431 B1
(45) Date of Patent: *Mar. 6, 2007

(54) SWEETENING COMPOSITIONS AND FOODSTUFFS COMPRISED THEREOF

(76) Inventor: Barnard Stewart Silver, 4391 S. Carol Jane Dr., Salt Lake City, UT (US) 84124-3601

( * ) Notice: Subject to any disclaimer, the term of this patent is extended or adjusted under 35 U.S.C. 154(b) by 70 days.

This patent is subject to a terminal disclaimer.

(21) Appl. No.: 09/618,813

(22) Filed: Jul. 18, 2000

Related U.S. Application Data

(63) Continuation-in-part of application No. 09/553,973, filed on Apr. 20, 2000, now abandoned, which is a continuation-in-part of application No. 09/379,952, filed on Aug. 24, 1999, now Pat. No. 6,399,142.

(60) Provisional application No. 60/098,195, filed on Aug. 27, 1998, provisional application No. 60/104,091, filed on Oct. 13, 1998.

(51) Int. Cl.
*A23L 1/236* (2006.01)
*A23G 3/00* (2006.01)

(52) U.S. Cl. .................. 426/548; 426/658; 536/128

(58) Field of Classification Search ............... 426/548, 426/658, 3, 549, 580, 582, 583, 590, 660; 536/128, 124
See application file for complete search history.

(56) References Cited

U.S. PATENT DOCUMENTS

| | | | |
|---|---|---|---|
| 4,304,768 A | 12/1981 | Staub et al. | |
| 4,311,722 A | 1/1982 | Vink et al. | |
| 4,746,520 A | 5/1988 | Smits et al. | |
| 5,238,698 A | 8/1993 | Zumbé et al. | |
| 5,319,048 A | 6/1994 | Carosino et al. | |
| 5,366,962 A | 11/1994 | Biton et al. | |
| 5,490,996 A | 2/1996 | Despland et al. | |
| 5,527,556 A | 6/1996 | Frippiat et al. | |
| 5,547,697 A | 8/1996 | Lipsch et al. | |
| 5,659,028 A | 8/1997 | Coussement et al. | |
| 5,721,004 A * | 2/1998 | James .................. 426/573 | |
| 5,827,526 A | 10/1998 | Dohnalek et al. | |
| 5,840,884 A | 11/1998 | Lis et al. | |
| 5,882,709 A | 3/1999 | Zumbe | |
| 5,989,619 A | 11/1999 | Zumbe et al. | |
| 6,248,386 B1 * | 6/2001 | Willibald-Ettle et al. ... 426/516 |
| 6,399,142 B1 * | 6/2002 | Silver .................. 426/658 |
| 6,423,358 B1 | 7/2002 | Barndt et al. | |

FOREIGN PATENT DOCUMENTS

| | | | |
|---|---|---|---|
| DE | 195 14 274 A1 | | 10/1996 |
| DE | 19709304 A1 | * | 9/1998 |
| EP | 0 787 745 A2 | | 8/1997 |
| EP | 0787745 | * | 8/1997 |
| EP | 0 861 852 A1 | | 9/1998 |
| WO | WO 91/13076 | | 9/1991 |
| WO | WO 93/02566 | | 2/1993 |
| WO | WO 98/38223 | | 9/1998 |
| WO | WO 98/42206 | | 10/1998 |

OTHER PUBLICATIONS

Birch et al., AN 73(11):G0549 FSTA, abstracting Confectionery Production, 1973, 39(2), 73-76.*
Teeuwen et al., AN 93(03): T0011 FSTA, abstracting International Food Ingredients, 1992, No. 5, 10-14.*
Thon, M., AN 359264 FROSTI, abstracting Food Tech Europe, 1994, 1(4), 62+64.*
John Peldyak, DMD, "Xylitol: Sweeten Your Smile," 1996, pp. 2-52.
Teeuwen, H.; Thoné, M.; Vandorpe, J. "Inulin: A Versatile Ancient Food Ingredient Rediscovered"; *International Food Ingredients*, No. 5, 1992, pp. 10-14.
Birch, G. G.; Soon, E. B. T. "The Composition and Properties of Diabetic Jams"; *Confectionery Production*, Feb. 1973, pp. 73-76.

* cited by examiner

*Primary Examiner*—Leslie Wong
(74) *Attorney, Agent, or Firm*—Brinks Hofer Gilson & Lione; Gregory H. Zayia

(57) ABSTRACT

A composition for sweetening foodstuffs comprises at least one sweetening agent (e.g., polyol, monosaccharide, disaccharide, trisaccharide, and combinations thereof), and inulin, which comprises at least about 25 percent by weight of the combination of sweetening agent and inulin. A foodstuff comprises a sweetening composition comprising at least one sweetening agent (e.g., polyol, monosaccharide, disaccharide, trisaccharide, and combinations thereof), and inulin, which comprises at least about 25 percent by weight of the combination of sweetening agent and inulin.

29 Claims, No Drawings

SWEETENING COMPOSITIONS AND FOODSTUFFS COMPRISED THEREOF

RELATED APPLICATION

This application is a continuation-in-part of application Ser. No. 09/553,973 filed Apr. 20, 2000, now abandoned which is a continuation-in-part of application Ser. No. 09/379,952 filed Aug. 24, 1999, now U.S. Pat. No. 6,399,142, which claims the priority of provisional applications 60/098,195, filed Aug. 27, 1998, and 60/104,091, filed Oct. 13, 1998, all of the foregoing of which are incorporated herein by reference, except that in the event of any inconsistent disclosure or definition from the present application, the disclosure or definition herein shall be deemed to prevail.

FIELD OF THE INVENTION

The present invention relates to sweetening compositions for foodstuffs, for example, sweetening compositions comprising polyols, monosaccharides, disaccharides, trisaccharides, and combinations thereof, and more particularly, to anti-diarrheal sweetening compositions comprising at least one sweetening agent.

BACKGROUND

The substitution of all or a portion of the sucrose in a foodstuff with various other sweetening agents (e.g., polyols, monosaccharides, polysaccharides, and combinations thereof) has a number of advantages, which are well-appreciated in the art. Of particular interest to the health- and fitness-conscious public, foodstuffs sweetened with polyols (e.g., xylitol, sorbitol, etc.) have fewer calories than their sucrose-containing counterparts. In addition, the lower glycemic index of polyols, such as xylitol and sorbitol, as compared to sugars such as sucrose and glucose, has led to the widespread use of polyols as sweeteners in diabetic foods. Furthermore, the well-established dental benefits of using polyols such as xylitol in place of sweeteners such as sucrose (e.g., dramatic reductions in new tooth decay, arrest and, in some instances, reversal of existing dental decay) makes polyols desirable for use as sweeteners in a wide variety of foodstuffs. Additionally, evidence suggests that the consumption of xylitol and of foodstuffs sweetened with xylitol may be effective means for preventing and treating chronic ear infections (otitis media) in children (e.g., "A Sugarless Gum May Help to Prevent Ear Infections in Kids," by Tara Parker-Pope, in *The Wall Street Journal, Health Journal*, Jun. 30, 2000).

In spite of such advantages, there are several problems to the use of polyols as sweeteners. As noted in a parent of this application (Ser. No. 09/379,952 filed Aug. 24, 1999), the substitution of all or a portion of the sucrose in a foodstuff with various other sweetening agents often necessitates that a "bulking agent" be used to "back fill" the volume of sucrose replaced. An ideal bulking agent restores the physical and chemical characteristics of sucrose to a foodstuff without significantly increasing calories and cost. Moreover, in spite of the substantial advantages attending the sweetening of foodstuffs with polyols (e.g., xylitol, sorbitol, mannitol, maltitol, etc.) and/or other sweetening agents (e.g., monosaccharides, polysaccharides), the ingestion of higher doses of such sweetening agents and/or the lack of systemic adaptation to such sweetening agents in sensitive individuals may result in unpleasant side effects which include diarrhea and symptoms associated with diarrhea. These side effects are particularly pronounced when a foodstuff containing one or more sweetening agents is consumed on an empty stomach, or when the foodstuff in question is a beverage.

Sucrose and dextrose reportedly can produce diarrhea in some cases. *Food, The Yearbook of Agriculture* 1959, The United States Department of Agriculture, Washington, D.C, page 288, under the chapter on INFANTS AND TODDLERS reports that cane sugar (i.e. sucrose) in concentrations of more than 8 percent and dextrose (i.e., the dextrorotatory form of glucose) of more than 6 percent of the feeding (of infants and toddlers) draw water from the tissues into the gastrointestinal tract and cause some diarrhea and dehydration.

It has been found that inulin is an ideal bulking agent for use in combination with sweetening agents such as polyols, monosaccharides, disaccharides and polysaccharides.

SUMMARY

The scope of the present invention is defined solely by the appended claims, and is not affected to any degree by the statements within this summary.

Briefly stated, the present invention is directed to a novel sweetening composition. The sweetening composition includes at least one sweetening agent selected from the group consisting of polyol, monosaccharide, disaccharide, and combinations thereof. The sweetening composition further includes inulin, which comprises at least about 25 percent by weight of the combination of the sweetening agent or agents and inulin.

In another aspect, the present invention is directed to a foodstuff which comprises a sweetening composition. The sweetening composition includes at least one sweetening agent selected from the group consisting of polyol, monosaccharide, disaccharide, and combinations thereof. The sweetening composition further includes inulin, which comprises at least about 25 percent by weight of the combination of the sweetening agent or agents and inulin.

In another aspect, the present invention is directed to a method for preparing a foodstuff comprised of a plurality of ingredients. The method comprises: (a) combining a first of the ingredients with at least one sweetening agent selected from the group consisting of polyol, monosaccharide, disaccharide, and combinations thereof; and (b) combining a second of the ingredients with inulin in an amount which comprises at least about 25 percent by weight of the combination of said at least one sweetening agent and said inulin. The aforementioned first and second of the ingredients can be either the same ingredient or else different ingredients.

In another aspect, the present invention is directed to a method for preparing a foodstuff. The method comprises adding to said foodstuff (i) at least one sweetening agent selected from the group consisting of polyol, monosaccharide, disaccharide, and combinations thereof; and (ii) inulin, which comprises at least about 25 percent by weight of the combination of said at least one sweetening agent and said inulin. The at least one sweetening agent and the inulin can be added to the foodstuff either in combination at the same time, or else in separate portions at different times.

In order to reduce or eliminate the unpleasant side effects of diarrhea associated with consumption of foodstuffs sweetened by sweetening agents such as polyols, monosaccharides, and polysaccharides, it has been found that such unpleasant side effects can be reduced or eliminated by incorporating inulin into the sweetening compositions in certain minimum amounts.

The presently preferred embodiments described herein possess many advantages, including: providing dental benefits including the prevention of new tooth decay; providing foodstuffs which are suitable for consumption by diabetics; reducing the diarrhea associated with the consumption of foodstuffs containing one or more sweetening agents; and providing beverages containing one or more sweetening agents, the consumption of which does not induce diarrhea.

DETAILED DESCRIPTION OF THE PRESENTLY PREFERRED EMBODIMENTS

The following definitions are to be understood throughout this description and in the appended claims: A "foodstuff" is a substance that can be used or prepared for use as a food. A "carbohydrate," as defined in *Organic Chemistry, Second Edition* by William H. Brown and Christopher S. Foote (Saunders, 1998), is a polyhydroxyaldehyde, polyhydroxyketone, or substance that gives these compounds upon hydrolysis. A "monosaccharide" is a carbohydrate that cannot be hydrolyzed to a simpler carbohydrate. A "disaccharide" is a carbohydrate containing two monosaccharide units joined by a glycoside bond. A "trisaccharide" is a carbohydrate containing three monosaccharide units joined by a glycoside bond. A "polysaccharide," as defined in Webster's Ninth New Collegiate Dictionary (Merriam-Webster, 1988), is a carbohydrate that can be decomposed by hydrolysis into two or more molecules of monosaccharides (thus, this definition subsumes the definitions of disaccharide and trisaccharide). A "polyol" is the product obtained from the reduction of a carbohydrate, whereby the carbonyl group (C=O) of a monosaccharide unit is replaced with a CHOH moiety. As used hereinbelow, the phrase "sweetening agent" denotes a saccharide or a polyol-particularly one which tends to impart a sweet taste in the mouth, and which tends to induce diarrhea and symptoms associated with diarrhea upon ingestion in certain minimum amounts. Thus, the phrase "sweetening agent" encompasses polyols, monosaccharides, disaccharides and trisaccharides—each of which may induce diarrhea—as well as other polysaccharides (e.g., composed of four or more monosaccharide units), which may similarly induce gastrointestinal problems upon ingestion. "Inulin" refers to a mixture of polysaccharides having various molecular weights or degrees of polymerization; in general, inulin consists of fructose units with β1–2 bonds terminating in a glucose unit. "Raw" inulin refers to inulin containing low molecular-weight and high molecular-weight polysaccharides. Low molecular-weight inulin refers to those fractions of inulin comprising polysaccharides having molecular weights primarily below about 2288. High molecular-weight inulin refers to those fractions of inulin comprising polysaccharides having molecular weights primarily above about 2288. By primarily is meant at least 75% by weight of the inulin fraction. "Intense sweeteners" is a term well-known in the art, which refers to compounds that are significantly sweeter than sucrose.

A sweetening composition embodying features of the present invention comprises at least one sweetening agent and inulin. Preferably, the inulin is present in an amount sufficient to reduce diarrhea which has been induced, at least in part, by consumption of the sweetening agent. Preferably, the sweetening agent is selected from the group consisting of polyol, monosaccharide, disaccharide, and combinations thereof. More preferably, the sweetening agent is a polyol. The polyols contemplated for use in accord with the present invention may be any polyhydric alcohols suitable for use in foodstuffs. Suitable polyols include but are not limited to: xylitol, sorbitol, maltitol, mannitol, isomalt, isomaltitol, lactitol, hydrogenated starch hydrolysates, glycerol, propylene glycol, erythoritol, galactitol, and the like, and combinations thereof. Preferably, the polyol is selected from the group consisting of xylitol, sorbitol, maltitol, mannitol, and combinations thereof. More preferably, the polyol is selected from the group consisting of xylitol, sorbitol, and a combination thereof. Still more preferably, the polyol is xylitol.

Preferably, the sweetening agent is present in the sweetening composition in an amount sufficient to impart a sweet taste in the mouth. Furthermore, in view of the well-established link between the prevention of caries (i.e., tooth decay) and the consumption of certain polyols (e.g., xylitol) that cannot be fermented by oral bacteria, the polyol is preferably present in the sweetening composition in an amount sufficient to impart protection to the teeth. While neither desiring to be bound by any particular theory, nor intending to affect in any measure the scope of the appended claims, the applicant presently believes that the prevention of caries through consumption of polyols like xylitol involves imparting an alkaline pH (i.e., pH>7) to the saliva in the mouth. Thus, the polyol is preferably present in the sweetening composition in an amount sufficient to impart alkalinity to the saliva in the mouth. The advantages of substituting all or a portion of the sucrose in a foodstuff with a polyol—particularly xylitol—are described at length in the essay "Xylitol, Sweeten Your Smile" by John Peldyak, DMD.

The inulin used in sweetening compositions embodying features of the present invention comprises polysaccharides having a variety of molecular weights. The molecular weight of inulin polysaccharides useful in the practice of the present invention is not narrowly limited, and raw inulin can be used in the sweetening compositions. Preferably, the inulin used in the sweetening compositions comprises low molecular weight inulin in an amount which is preferably at least about 75 percent by weight of the inulin. Alternatively, in another preferable embodiment, the inulin used in the sweetening compositions comprises high molecular weight inulin in an amount which is preferably at least about 75 percent by weight of the inulin. Fractions of inulin comprising at least about 75 percent by weight of low molecular weight inulin are readily available via extraction from chicory root using the method developed by the present inventor and fully described in pending patent application Ser. No. 09/379,952 filed Aug. 24, 1999, the content of which has already been incorporated herein by reference.

Inulin is added to the sweetening compositions in an amount preferably sufficient to reduce diarrhea which has been induced, at least in part, by consumption of the sweetening agent. It has been discovered that, in order to reduce diarrhea, inulin comprises preferably at least about 25 percent by weight of the combination of sweetening agent or agents and inulin. Desirably, inulin comprises at least about 30 percent by weight of the combination of sweetening agent or agents and inulin. More preferably, inulin comprises at least about 35 percent by weight of the combination of sweetening agent or agents and inulin. Still more preferably, inulin comprises at least about 40 percent by weight of the combination of sweetening agent or agents and inulin.

In addition to the efficaciousness of inulin in reducing diarrhea which has been induced, at least in part, by the consumption of a sweetening agent, it has also been found that inulin is an ideal bulking agent for use in combination with sweetening agents such as polyols, monosaccharides, disaccharides and combinations thereof (see parent application Ser. No. 09/379,952 filed Aug. 24, 1999). More preferably, the sweetening agent is a polyol. The polyols contemplated for use in accord with this aspect of the present invention may be any polyhydric alcohols suitable for use in foodstuffs. Suitable polyols include but are not limited to: xylitol, sorbitol, maltitol, mannitol, isomalt, isomaltitol, lactitol, hydrogenated starch hydrolysates, glycerol, propylene glycol, erythoritol, galactitol, and the like, and combinations thereof. Preferably, the polyol is selected from the group consisting of xylitol, sorbitol, maltitol, mannitol, and combinations thereof. More preferably, the polyol is selected from the group consisting of xylitol, sorbitol, and a combination thereof. Still more preferably, the polyol is xylitol.

The inulin used as a bulking agent in sweetening compositions embodying features of the present invention comprises polysaccharides having a variety of molecular weights. The molecular weight of inulin polysaccharides useful in this aspect of the present invention is not narrowly limited, and raw inulin can be used as a bulking agent. Preferably, the inulin used as a bulking agent in the sweetening compositions comprises low molecular weight inulin in an amount which is preferably at least about 75 percent by weight of the inulin. Alternatively, in another preferable embodiment, the inulin used as a bulking agent in the sweetening compositions comprises high molecular weight inulin in an amount which is preferably at least about 75 percent by weight of the inulin. Fractions of inulin comprising at least about 75 percent by weight of low molecular weight inulin are readily available via extraction from chicory root using the method developed by the present inventor and fully described in pending patent application Ser. No. 09/379,952 filed Aug. 24, 1999, the content of which has already been incorporated herein by reference.

As a bulking agent, inulin is added to the sweetening compositions embodying features of the present invention in an amount preferably comprising at least about 25 percent by weight of the combination of sweetening agent or agents and inulin. Desirably, the inulin bulking agent comprises at least about 30 percent by weight of the combination of sweetening agent or agents and inulin. More preferably, the inulin bulking agent comprises at least about 35 percent by weight of the combination of sweetening agent or agents and inulin. Still more preferably, the inulin bulking agent comprises at least about 40 percent by weight of the combination of sweetening agent or agents and inulin.

While neither desiring to be bound by any particular theory, nor intending to affect in any measure the scope of the appended claims, the applicant presently believes, in accord with at least one authority (viz., U.S. Pat. No. 4,304,768, col. 2, ll. 47–50), that the induction of diarrhea caused by consumption of polyols—in particular by xylitol, which generally causes less problems than other polyols (e.g., sorbitol and mannitol)—stems from the inability of the stomach and small intestine to metabolize or otherwise break them down, thus resulting in their rapid passage into the large intestine. Thus, large single servings of xylitol, especially when ingested in liquid form, can induce diarrhea or symptoms of diarrhea. An analogous explanation is believed to account for the induction of diarrhea by consumption of polysaccharides. Regardless of the particular theories, the alleviation of diarrhea discussed herein results from preferred embodiments of the present invention.

Alternative sweetening compositions embodying features of the present invention may contain sweetening agents other than or in addition to polyols. Suitable sweetening agents include monosaccharides, polysaccharides (e.g. disaccharides, trisaccharides, etc.), intense sweeteners, and the like, and combinations thereof. Suitable monosaccharides include but are not limited to: glyceraldehyde, erythrose, threose, ribose, arabinose, xylose, lyxose, allose, altrose, glucose, mannose, gulose, idose, galactose, talose, dihydroxyacetone, erythrulose, ribulose, xylulose, psicose, fructose, sorbose, tagatose, and combinations thereof. Preferably, the monosaccharide is selected from the group consisting of fructose, glucose, and a combination thereof. As is well known in the art (e.g., *American Journal of Clinical Nutrition,* 1993, vol. 58, pp. 748S–753S), fructose is not absorbed by the intestines as well as sucrose or glucose and, as a result, can cause gastrointestinal problems such as diarrhea. Thus, fructose is advantageously employed in admixture with inulin, in accord with the present invention. More preferably, the monosaccharide is fructose.

Suitable polysaccharides include but are not limited to: disaccharides such as maltose, lactose, isomaltulose, maltulose, isomaltose, cellobiose, sucrose, and the like, and combinations thereof; trisaccharides such as raffinose; and polysaccharides containing four or more monosaccharide units such as starch, glycogen, cellulose, polydextrose, polymaltose, modified polydextrose, maltodextrins, and the like, and combinations thereof. Preferably, the polysaccharide is selected from the group consisting of disaccharides, and combinations thereof. As is well known in the art (e.g., *Biochemistry,* Fourth Edition by Lupert Stryer, W. H. Freeman and Co., 1995, p. 472; Food, *The Yearbook of Agriculture* 1959, The United States Department of Agriculture, p. 99), the majority of adults in the world are deficient in lactase and, therefore, intolerant of lactose and lactose-containing foodstuffs (e.g., milk). As the manifestations of lactose intolerance include diarrhea and a spectrum of gastrointestinal discomforts (e.g., abdominal distention, nausea, cramping, and pain), lactose is advantageously employed in admixture with inulin, in accord with the present invention. The polysaccharide is preferably the disaccharide lactose. Preferred compositions comprising inulin and lactose (e.g., Example 9 below) provide the mouthfeel of fat and have a nearly zero glycemic index. Such compositions can be used to partially or completely replace the butterfat components of some foodstuffs (e.g., cheese, milk and yogurt).

It has been discovered that combinations of inulin, lactose and either fructose or xylitol give a sweetness closely approximating sucrose, and for at least that reason are preferred combinations. Specific embodiments of such preferred combinations are illustrated in Examples 3, 4, 6, 10, 11, 12 and 13 below.

Sucrose, because of its availability is advantageously employed in admixture with inulin, in accord with the present invention, to minimize or eliminate diarrhea or symptoms associated with diarrhea in infants and toddlers.

Intense sweeteners may also be used in sweetening compositions embodying features of the present invention. Considerably smaller quantities of intense sweeteners are used to impart a sweet taste in the mouth, as compared to sucrose. Intense sweeteners suitable for use in the present invention include but are not limited to: sucralose, aspartame (NutraSweet®), acesulfame K (Sunette®), saccharin, stevia sweeteners, glycyrrhizin, thaumatin, cyclamates, neohesperidin, dihydrochalone, alitame, and the like, and combinations thereof. Preferably, the intense sweetener is sucralose.

Sweetening compositions embodying features of the present invention can be advantageously employed in the preparation of a wide variety of foodstuffs including but not limited to: gum, tablets and lozenges, candy (e.g., gummy, hard, etc.), chocolate, ice cream, cheese, yogurt, cottage cheese, milk, bakery products (e.g., cake, cookies, bread), sauces and dressings, tabletop sweetener, beverages, medications, and oral hygiene products. Presently preferred foodstuffs prepared in accordance with the present invention include gum, candy, chocolate, ice cream, cheese, yogurt, cottage cheese, milk, cake, and cookies.

The manner in which a sweetening composition embodying features of the present invention is made, and the process by which such a composition is used for the preparation of a foodstuff, will be abundantly clear to one of ordinary skill in the art based upon joint consideration of both the preceding description, and the following representative and non-limiting examples.

Example 1

A preferred sweetening composition embodying features of the present invention is a mixture of 52 percent by weight of inulin powder and 48 percent by weight of xylitol crystals. The inulin is preferably that sold under the name RAFTILINE® ST GEL and supplied by ORAFTI s.a. (Belgium). The xylitol is preferably that supplied by Cultor Food Science, Inc. (Ardsley, N.Y.). The mixture of inulin and xylitol is mechanically mixed (e.g., in a double coil mixer) to evenly distribute the constituents of the sweetening composition. The well-mixed sweetening composition then may be employed as a table sweetener or as a foodstuff, especially desserts.

Example 2

A preferred sweetening composition embodying features of the present invention is a mixture of 52 percent by weight of inulin powder and 48 percent by weight of crystalline fructose. The inulin is preferably that identified in Example 1. The fructose is preferably that sold under the name KRYSTAR 300 and supplied by A.E. Staley Manufacturing Co. (Decatur, Ill.). The mixture of inulin and fructose is mechanically mixed (e.g., in a double coil mixer) to evenly distribute both components of the sweetening composition. The well-mixed sweetening composition then may be employed as a table sweetener or as a foodstuff.

Example 3

A preferred sweetening composition for use in the preparation of diabetic foodstuffs having a zero glycemic index is a mixture of 36.82 percent by weight of inulin, 31.66 percent by weight of fructose, and 31.52 percent by weight of xylitol. The inulin and xylitol are preferably supplied by the suppliers identified in Example 1. The fructose is preferably that identified in Example 2. The mixture of inulin, fructose and xylitol is mechanically mixed (e.g., in a double coil mixer) to evenly distribute all components of the sweetening composition. The well-mixed sweetening composition then may be employed as a table sweetener or as a foodstuff.

Example 4

A preferred sweetening composition embodying features of the present invention is a mixture of 37.18 percent by weight of inulin, 30.80 percent by weight of fructose, and 32.02 percent by weight of lactose. The inulin is preferably that identified in Example 1, and reduces diarrhea induced by the fructose and/or lactose. The fructose is preferably that identified in Example 2, and provides sweetness and quick energy. The lactose is preferably that supplied by Foremost Farms (Baraboo, Wis.). The mixture of inulin, fructose, and lactose is mechanically mixed (e.g., in a double coil mixer) to evenly distribute all components of the sweetening composition. The well-mixed sweetening composition then may be employed as a table sweetener or as a foodstuff.

Example 5

A preferred, very gentle sweetening composition embodying features of the present invention is a mixture of 53.73 percent by weight of inulin, and 46.27 percent by weight of lactose. The inulin is preferably that identified in Example 1, and reduces diarrhea induced by the lactose. The lactose is preferably that identified in Example 4. The mixture of inulin and lactose is mechanically mixed (e.g., in a double coil mixer) to evenly distribute all components of the sweetening composition. The well-mixed sweetening composition then may be employed as a table sweetener or as a foodstuff.

Example 6

A preferred sweetening composition embodying features of the present invention, having a near zero glycemic index and providing a low caloric intake, is a mixture of 36.52 percent by weight of inulin, 32.22 percent by weight of lactose, and 31.26 percent by weight of xylitol. The inulin and xylitol are preferably supplied by the suppliers identified in Example 1. The lactose is preferably that identified in Example 4. The mixture of inulin, lactose and xylitol is mechanically mixed (e.g., in a double coil mixer) to evenly distribute all components of the sweetening composition. The well-mixed sweetening composition then may be employed as a table sweetener or as a foodstuff.

Example 7

A preferred sweetening composition embodying features of the present invention, providing a high caloric intake for strong energy and imparting a sweet flavor, is a mixture of 28.93 percent by weight of inulin, 24.88 percent by weight of fructose, 24.50 percent by weight of sucrose, and 21.69 percent by weight of glucose. The inulin is preferably that identified in Example 1, and reduces diarrhea induced by other ingredients. The fructose is preferably that identified in Example 2. The sucrose is preferably that supplied by the Western Sugar Company (Denver, Colo.). The glucose is preferably that sold under the name STALEYDEX® 333 DEXTROSE and supplied by A.E. Staley Manufacturing Co. (Decatur, Ill.). The mixture of inulin, fructose, sucrose and glucose is mechanically mixed (e.g., in a double coil mixer) to evenly distribute all components of the sweetening composition. The well-mixed sweetening composition then may be employed as a table sweetener or as a foodstuff in drinks for athletes.

Example 8

A preferred sweetening composition embodying features of the present invention, providing a reduced caloric and sucrose intake, is 52 percent by weight inulin powder and 48 percent by weight of sucrose. The inulin is preferably that identified in Example 1. The sucrose is preferably that identified in Example 7. The mixture of inulin and sucrose is mechanically mixed (e.g., in a double coil mixer) to evenly distribute the constituents of the sweetening composition. The well-mixed sweetening composition then may be employed as a table sweetener or as a foodstuff.

Example 9

A preferred natural fat-replacing composition embodying features of the present invention, which provides the mouthfeel of fat and has a nearly zero glycemic index, is 57.72% inulin and 42.28% lactose. The inulin is preferably that identified in Example 1. The lactose is preferably that identified in Example 4. The mixture of inulin and lactose is mechanically mixed (e.g., in a double coil mixer) to evenly distribute the constituents of the composition. The well-mixed composition then may be employed as a fat replacement in a foodstuff.

While it is desirable to mix the inulin and sweetening agent (or agents) in order to evenly distribute the constituents of the sweetening composition (Examples 1–9), the use of a mechanical mixer for this purpose is not required. Mixing can be alternatively be accomplished by shaking (e.g., in a closed container), grinding (e.g., in a mortar and pestle), or other methods which are known to those of ordinary skill in this art.

Similarly, while it is convenient to combine and mix the inulin and sweetening agent (or agents) prior to employing the sweetening compositions of the present invention as table sweeteners or in foodstuffs, there is no necessity to do so. Inulin and each of the sweetening agents present in the final composition can be added separately to the foodstuff or item to be sweetened, so long as each constituent is added eventually, and is present in a preferable amount (Example 10). In the examples that follow, the inulin, fructose, lactose and xylitol employed are preferably supplied by the suppliers identified in the preceding examples.

Example 10

Recipe for Carrot Cake

½ cup inulin
¼ cup fructose [alternatively, lactose]
¼ Cup xylitol
1 tablespoon lactose
½ Cup oil
2 eggs beaten
1½ cups grated carrots
1 cup unsifted flour
½ teaspoon salt
1 teaspoon baking soda
1 teaspoon cinnamon
½ Cup each ground coconut, nuts, raisins Combine inulin, fructose, xylitol, lactose and oil. Add eggs. Mix well. Add grated carrots. Slowly stir in sifted dry ingredients. Add ground coconut, nuts and raisins. Pour batter into lightly greased and floured 9"×9" square cake pan. Bake at 400 degrees Fahrenheit for 20 to 30 minutes, or until done.

By comparison with a cake prepared using 1 cup sugar, the cake prepared according to this recipe with a sweetening composition containing inulin, fructose and xylitol has a somewhat denser texture.

Example 11

Recipe for Orange Sponge Cake 8 eggs, separated
¼ teaspoon salt
1 teaspoon cream of tartar
1 cup sweetening composition (⅔ cup inulin, ⅓ cup xylitol, ⅓ cup lactose)
Grated rind from one orange
¼ cup orange juice
1 cup plus 2 tablespoons flour, sifted
½ cup almonds, blanched and toasted
1 cup cream whipped Beat egg whites and salt until foamy. Add cream of tartar and beat until stiff, not dry. Gradually add ⅔ cup sweetening composition, beating after each addition. Beat egg yolks until very thick and lemon colored. Add remaining ⅔ cup sweetening composition, orange rind and juice. Fold the two mixtures together and fold in flour. Bake for one hour in an ungreased 10" angel cake pan at 325 degrees Fahrenheit. Remove from oven and invert for one hour. Chop almonds coarsely. Spread whipped cream on cake and sprinkle with almonds.

By comparison with a cake prepared using 1⅓ cups sugar, the cake prepared according to this recipe with a sweetening composition containing inulin, xylitol and lactose has a denser texture, does not rise as high, may cook more rapidly, and is slightly less sweet (although very palatable nonetheless).

Example 12

Recipe for Angel Cake 1 cup sifted cake flour
¾ cup sweetening composition (2 parts inulin, 1 part xylitol, 1 part lactose)
1½ cups (12) egg whites
1½ teaspoons cream of tartar
¼ teaspoon salt
1½ teaspoons vanilla
¾ cup sweetening composition (2 parts inulin, 1 part xylitol, 1 part lactose)

Sift flour with ¾ cup sweetening composition 4 times. Beat egg whites with cream of tartar, salt, and vanilla until stiff enough to form soft peaks while remaining moist and glossy. Add the remaining ⅔ cup sweetening composition, 2 tablespoons at a time, continuing to beat until meringue holds stiff peaks. Sift about ¼ of flour mixture over white. Fold in. Fold in remaining flour by fourths. Bake in ungreased 10" tube pan in moderate oven (375 degrees Fahrenheit) 35 to 40 minutes or until done. Invert pan and let cake cool.

Example 13

Recipe for Feather Sponge Cake 6 egg yolks
½ cup cold water
1½ cups sweetening composition (2 parts inulin, 1 part lactose,
1 part xylitol).
½ teaspoon vanilla
½ teaspoon orange or lemon extract
1½ cups sifted cake flour ¼ teaspoon salt
6 egg whites
¾ teaspoon cream of tartar Beat egg yolks until thick and lemon-colored. Add water. Continue beating until very thick. Gradually beat in sweetening composition, then vanilla and orange extract. Sift flour with salt. Fold into egg-yolk mixture a little at a time.

Beat egg whites with cream of tartar until stiff peaks form. Fold into first mixture, turning bowl gradually.

Bake in ungreased 10" tube pan in slow oven (325 degrees Fahrenheit) for about 1 hour. Invert pan to cool. Swirl with fluffy frosting, or slice and serve with fresh fruit or ice cream.

The foregoing examples were provided by way of explanation and illustration, and are not intended to limit the scope of the appended claims. Variations in the manner of making and using the presently preferred embodiments will be obvious to one of ordinary skill in the art, and remain within the scope of the following claims.

What is claimed is:

1. A sweetening composition comprising:
at least one sweetening agent comprising a polyol; and
inulin, which comprises at least about 25 percent by weight of the combination of said at least one sweetening agent and said inulin, such that a tendency of the polyol to induce diarrhea upon consumption is at least partially reduced.

2. The composition of claim 1, wherein said polyol is selected from the group consisting of xylitol, sorbitol, maltitol, mannitol, isomalt, isomaltitol, lactitol, hydrogenated starch hydrolysates, glycerol, propylene glycol, erythoritol, galactitol, and combinations thereof.

3. The composition of claim 1, wherein said polyol is selected from the group consisting of xylitol, sorbitol, maltitol, mannitol, and combinations thereof.

4. The composition of claim 1, wherein said polyol is selected from the group consisting of xylitol, sorbitol, and a combination thereof.

5. The composition of claim 1, wherein said polyol is xylitol.

6. The composition of claim 1, in which said sweetening agent further comprises a polysaccharide containing at least three monosaccharide units.

7. The composition of claim 1, wherein said sweetening agent further comprises a monosaccharide selected from the group consisting of glyceraldehyde, erythrose, threose, ribose, arabinose, xylose, lyxose, allose, altrose, glucose, mannose, gulose, idose, galactose, talose, dihydroxyacetone, erythrulose, ribulose, xylulose, psicose, fructose, sorbose, tagatose, and combinations thereof.

8. The composition of claim 7, wherein said monosaccharide is selected from the group consisting of fructose, glucose, and a combination thereof.

9. The composition of claim 7, wherein said monosaccharide comprises fructose.

10. The composition of claim 1, wherein said sweetening agent further comprises a disaccharide selected from the group consisting of maltose, lactose, sucrose, isomaltulose, maltulose, isomaltose, cellobiose, and combinations thereof.

11. The composition of claim 10, wherein said disaccharide comprises maltose.

12. The composition of claim 10, wherein said disaccharide comprises lactose.

13. A sweetening composition comprising:
a sweetening agent comprising a polyol and fructose; and
inulin, which comprises at least about 25 percent by weight of the combination of said sweetening agent and said inulin, such that a tendency of the polyol and/or fructose to induce diarrhea upon consumption is at least partially reduced.

14. The composition of claim 13, wherein said polyol comprises xylitol.

15. The composition of any one of claims 1 to 14, wherein said inulin comprises at least about 30 percent by weight of the combination of said at least one sweetening agent and said inulin.

16. The composition of any one of claims 1 to 14, wherein said inulin comprises at least about 35 percent by weight of the combination of said at least one sweetening agent and said inulin.

17. The composition of any one of claims 1 to 14, wherein said inulin comprises at least about 40 percent by weight of the combination of said at least one sweetening agent and said inulin.

18. The composition of any one of claims 1 to 14, wherein said inulin comprises polysaccharides having molecular weights up to and including about 2288, in an amount of at least 75 percent by weight of said inulin.

19. The composition of any one of claims 1 to 14, wherein said inulin comprises polysaccharides having molecular weights above about 2288, in an amount of at least 75 percent by weight of said inulin.

20. A sweetening composition comprising:
a sweetening agent comprising at least one polyol selected from the group consisting of xylitol, sorbitol, and a combination thereof; and
inulin, which comprises at least about 25 percent by weight of the combination of said at least one sweetening agent and said inulin, such that a tendency of the at least one polyol to induce diarrhea upon consumption is at least partially reduced.

21. A sweetening composition comprising:
a sweetening agent comprising xylitol, lactose, and fructose; and
inulin, which comprises at least about 25 percent by weight of the combination of said sweetening agent and said inulin, such that a tendency of the xylitol and/or lactose and/or fructose to induce diarrhea upon consumption is at least partially reduced.

22. A sweetening composition comprising:
a sweetening agent comprising lactose and xylitol; and
inulin, which comprises at least about 25 percent by weight of the combination of said sweetening agent and said inulin, such that a tendency of the lactose and/or xylitol to induce diarrhea upon consumption is at least partially reduced.

23. A foodstuff comprising a sweetening composition as recited in any one of claims 1, 13, 14, 20, 21 or 22.

24. A foodstuff comprising a sweetening composition as recited in any one of claims 1, 13, 14, 20, 21 or 22, wherein said foodstuff is selected from the group consisting of gum, candy, ice cream, cheese, yogurt, cottage cheese, cake, cookies and beverages.

25. The composition of any one of claims 1, 13, 14, 20, 21, 22 or 23, wherein said sweetening agent further comprises at least one intense sweetener.

26. A method for preparing a foodstuff comprised of a plurality of ingredients, said method comprising:
(a) combining a first of said ingredients with at least one sweetening agent comprising a polyol; and
(b) combining a second of said ingredients with inulin in an amount which comprises at least about 25 percent by weight of the combination of said at least one sweetening agent and said inulin, such that a tendency of the polyol to induce diarrhea upon consumption is at least partially reduced; wherein said first and said second of said ingredients are either the same ingredient or else different ingredients.

27. The method of claim 26, wherein said foodstuff is selected from the group consisting of candy, ice cream, cake, cookies and beverages.

28. A method for preparing a foodstuff, said method comprising:
adding to said foodstuff;
(i) at least one sweetening agent comprising a polyol; and
(ii) inulin, which comprises at least about 25 percent by weight of the combination of said at least one sweetening agent and said inulin, such that a tendency of the polyol to induce diarrhea upon consumption is at least partially reduced; wherein
said at least one sweetening agent and said inulin are added to said foodstuff either in combination at the same time, or else in separate portions at different times.

29. The method of claim 28, wherein said foodstuff is selected from the group consisting of candy, ice cream, cheese, cottage cheese, milk, cake, cookies and beverages.

* * * * *